(12) United States Patent
Popp et al.

(10) Patent No.: US 11,262,312 B2
(45) Date of Patent: Mar. 1, 2022

(54) LASER MICROSCOPE WITH ABLATION FUNCTION

(71) Applicants: LEIBNIZ-INSTITUT FÜR PHOTONISCHE, Jena (DE); FRIEDRICH-SCHILLER-UNIVERSITÄT JENA, Jena (DE)

(72) Inventors: Jürgen Popp, Jena-Kunitz (DE); Michael Schmitt, Jena (DE); Tobias Meyer-Zedler, Jena (DE); Stefan Nolte, Jena (DE); Roland Ackermann, Berlin (DE); Jens Limpert, Jena (DE)

(73) Assignees: LEIBNIZ-INSTITUT FUR PHOTONISCHE TECHNOLOGIEN E.V., Jena (DE); FRIEDRICH-SCHILLER-UNIVERSITAT JENA, Jena (DE)

( * ) Notice: Subject to any disclaimer, the term of this patent is extended or adjusted under 35 U.S.C. 154(b) by 28 days.

(21) Appl. No.: 16/303,558

(22) PCT Filed: May 19, 2017

(86) PCT No.: PCT/IB2017/052962
§ 371 (c)(1),
(2) Date: Nov. 20, 2018

(87) PCT Pub. No.: WO2017/199211
PCT Pub. Date: Nov. 23, 2017

(65) Prior Publication Data
US 2021/0223183 A1 Jul. 22, 2021

(30) Foreign Application Priority Data
May 20, 2016 (DE) ..................... 10 2016 109 303.3

(51) Int. Cl.
*G01N 21/71* (2006.01)
*G01N 21/64* (2006.01)
*G01N 21/65* (2006.01)

(52) U.S. Cl.
CPC ....... *G01N 21/718* (2013.01); *G01N 21/6458* (2013.01); *G01N 21/65* (2013.01); *G01N 2021/655* (2013.01); *G01N 2021/656* (2013.01)

(58) Field of Classification Search
CPC .. G01N 21/718; G01N 21/6458; G01N 21/65; G01N 2021/655; G01N 2021/656
See application file for complete search history.

(56) References Cited

U.S. PATENT DOCUMENTS 4,741,042 A * 4/1988 Throop ................. B07C 5/3422
209/587
6,166,385 A 12/2000 Webb et al.
(Continued)

FOREIGN PATENT DOCUMENTS

DE 102005044422 A1 3/2007
DE 102006039083 A1 2/2008
(Continued)

OTHER PUBLICATIONS

Minamikawa, Takeo, et al. "Real-time imaging of laser-induced membrane disruption of a living cell observed with multifocus coherent anti-Stokes Raman scattering microscopy." Journal of biomedical optics 16.2 (2011): 021111. (Year: 2011).*
(Continued)

*Primary Examiner* — Dominic J Bologna
(74) *Attorney, Agent, or Firm* — Hunton Andrews Kurth LLP

(57) ABSTRACT

An exemplary laser microscope can be provided, comprising at least one first laser source which emits at least one (e.g.,
(Continued)

pulsed) excitation beam, a scanning optical configuration (e.g., configured to scan the excitation beam over the surface of a sample), a focusing optical configuration (e.g., configured to focus the excitation beam onto the sample), and at least one detector configured to detect light emitted by the sample due to an optical effect in response to the excitation beam. A second laser source facilitates a pulsed ablation beam for a local ablation of the material of the sample. The ablation beam can be guided to the sample via the scanning and focusing optical configurations. The first and second laser sources can be fed by a mutual continuous wave pump laser and/or a mutual pulsed pump laser. The first laser source can emit pulses with at least two different wavelengths.

28 Claims, 5 Drawing Sheets

(56) References Cited

U.S. PATENT DOCUMENTS

| | | | |
|---|---|---|---|
| 2008/0315119 A1* | 12/2008 | Blackmore | G01N 21/6428 250/459.1 |
| 2009/0290150 A1 | 11/2009 | Takimoto et al. | |
| 2010/0177307 A1 | 7/2010 | Rimke et al. | |
| 2010/0286674 A1* | 11/2010 | Ben-Yakar | A61B 5/0066 606/10 |
| 2016/0103072 A1 | 4/2016 | Fukutake et al. | |

FOREIGN PATENT DOCUMENTS

| | | |
|---|---|---|
| DE | 102014110575 A1 | 1/2016 |
| EP | 1784633 A2 | 5/2007 |

OTHER PUBLICATIONS

English Machine translation of Jurgen, DE102005044422A1 (Year: 2007).*

Minamikawa et al., "Real-time imaging of laser-induced membrane disruption of a living cell observed with multifocus coherent anti-Stokes Raman scattering microscopy." Journal of Biomedical Optics, vol. 16(2), Feb. 2011, pp. 021111-1-201111-5.

Wokosin et al., "Optical workstation with concurrent, independent multiphoton imaging and experimental laser microbeam capabilities," Rev. Sci. Instrum., vol. 74(1), Jan. 2003, pp. 193-201.

International Search Report issued in International Patent Application No. PCT/IB2017/052962, dated Sep. 22, 2017, pp. 1-7 (with English translation).

Written Opinion issued in international Patent Application No. PCT/IB2017/052962, dated Sep. 22, 2017, pp. 1-11.

Ha et al., "Dual-Molecule Spectroscopy: Molecular Rulers for the Study of Biological Macromolecules," IEEE Journal of Selected Topics in Quantum Electronics, vol. 2(4), Dec. 1996.

European Official Action dated Dec. 17, 2019 for European Application No. 17726709.3.

* cited by examiner

LASER MICROSCOPE WITH ABLATION FUNCTION

CROSS REFERENCE TO RELATED APPLICATION(S)

This application relates to, and claims the benefit and priority from International Patent Application No. PCT/IB2017/052962 filed on May 19, 2017 that published as International Patent Publication No. WO 2017/199211 on Nov. 23, 2017, which claims the benefit and priority from German Patent Application No. 10 2016 109 3013 filed on May 20, 2016, the entire disclosures of which are incorporated herein by reference in their entireties.

FIELD OF THE DISCLOSURE

The present disclosure relates to a laser microscope, with which a sample can be examined by imaging, e.g., nonlinear optical, methods, as well as modified by a removal of material as well as a method for providing and/or operating the exemplary laser microscope.

BACKGROUND INFORMATION

For laser microscoping, a laser beam with a scanning optic can be scanned over a surface of the sample that should be examined. Thereby, the spatial resolution of the illuminated region on the sample is diffraction-limited. By using nonlinear optical effects, the resolution increases, since, e.g., only in the region with the highest light intensity a signal is generated. The diameter of this region is reduced by the factor $n-\frac{1}{2}$ for nonlinear effects of the order n.

Using nonlinear effects for imaging, at the same time, utilizes the transition from continuous to pulsed illumination. The effects are a quadratic function or a function with higher power of the light intensity, so that they only provide a viable signal beginning at a certain minimum intensity. Permanently operating at such intensity may require a very high technical effort, and at the same time likely destroy the sample by heating. Therefore, the laser energy can be concentrated in short pulses with high momentary intensity, whereas the average power deposited in the sample can be selected to such an extent that the sample will not be heated inadmissibly strong.

Such laser microscopes are, for example, known (see, e.g., T. Meyer et al. "A compact microscope setup for multimodal nonlinear imaging in clinics and its application to disease diagnostics", Analyst 138 (14), 4048-57 (2013); and T. Meyer et al., "Expanding Multimodal Microscopy by High Spectral Resolution Coherent Anti-Stokes Raman Scattering Imaging for Clinical Disease Diagnostics", Analytical Chemistry 85, 6703-6715 (2013)). These microscopes combine the coherent Raman scattering, e.g., stimulated Raman scattering (SRS) and coherent anti-Stokes Raman scattering (CARS), the two-photon excited fluorescence (TPEF) and using the second-harmonic generation (SHG) of the stimulation light, and if needed, also a higher harmonic. Such a multimodal imaging can be advantageous in a few ways. For example, a molecule specific contrast can be generated, by which, e.g., in a clinical diagnostic, pathologically changed tissue can be distinguished from healthy tissue. On the other hand, the nonlinear dependency of the light intensity of the mentioned effects may require that of the typically Gaussian distributed intensity profile of the pulse, only the center with the highest intensity contributes to the imaging. The spatial resolution therefore is better than it would be expected based on the diffraction limit.

Thus, there may be a need to address and/or resolve at least some of the deficiencies and/or issues present in the prior systems and/or methods.

OBJECT(S) OF THE PRESENT DISCLOSURE

One of the objects of the present disclosure is to improve and/or expand the prior laser microscopes (i) by an application in the near-infrared spectral range, and/or (ii) to locally modify the sample with a high precision.

This object can be realized by a laser microscope according to an exemplary embodiment of the present disclosure using, e.g., a laser source and by a method for providing and/or operating such exemplary laser source.

SUMMARY OF EXEMPLARY EMBODIMENT(S)

According to the exemplary embodiment of the present disclosure, a laser microscope with a laser source can be provided. For example, such exemplary laser microscope can comprise a first laser source, which can be configured to emit at least one excitation beam (which can be pulsed), a scanning optical configuration which can be configured to scan the excitation beam over the surface of a sample, a focusing optical configuration, which can be configured to focus the excitation beam onto the sample, and at least one detector which can be configured to detect light emitted by the sample due to an optical effect in response to the excitation beam impacting the sample. The exemplary laser microscope can, e.g., be configured for multi modal imaging.

The exemplary optical effect can be a linear effect. The imaging procedure can take place in an accelerated manner, as an extensive amount of signal intensity is available. It can be particularly advantageous for the optical effect to be nonlinear, since, e.g., the detector is sensitive to light that the sample emits in response to the excitation beam due to a nonlinear optical effect. Thus, this exemplary response can primarily be provided from the central region of the beam profile of the excitation beam, in which the momentary intensity is likely maximal.

According to this or another exemplary embodiment of the present disclosure, a second laser source for a pulsed ablation beam can be provided to locally ablate the material of the sample, whereas the ablation beam can be guided via the scanning optical configuration and the focusing optical configuration to the sample.

The laser microscope can use nonlinear imaging methods including but not limited to, e.g., Stimulated Raman Scattering (SRS), Coherent Anti-stokes Raman Spectroscopy (CARS), second harmonic generation (SHG), and/or two-photon excitation fluorescence (TPEF).

Such exemplary combination can facilitate a selection of structures from an imaged region, and, e.g., only highly selectively ablate these structures. A significantly higher intensity may be needed for ablating than for imaging. Nonetheless, such understanding does not determine that the spatial resolution has to be worse when ablating than when imaging. For example, by appropriately selecting the laser parameters, the pulses of the ablation beam can be configured in a way that they likely directly interact with and ionize the electron shells of the atoms of the sample material in the sample. Therefore, the sample material can be locally vaporised by transferring the electrons in a plasma. If the ablation pulse is short enough, such pulse can interact, e.g., only in this manner with the sample material, such that in particular no heat in form of excited states is deposited in the sample. Thus, the ionisation of the electron shell may need such a high momentary intensity, as it is only present in the direct center of the spatial intensity distribution of the ablation pulse. The spatial distribution of the ablation can therefore be at least as good as the spatial distribution of the imaging, and likely better.

The excitation beam and/or the ablation beam do not only have a lateral inhomogeneous intensity distribution, e.g., in the plane perpendicular to the direction of propagation. The intensity likely also fluctuates in the direction of propagation, respectively. Therefore, the center of the highest intensity is strongly localized also not only lateral, but also in the direction of propagation, respectively. The ablated volume can be in the region of single cells, e.g., approx. 1 pl (picolitre). The imaged and/or ablated region can thus be selected laterally as well as also with respect to the depth below the surface of the sample. Thus, for example, structures within a biological sample can be examined and selectively changed without initially having to open the surface of the sample at the location of these structures, which can be destructive. For example, both the excitation and ablation beams can penetrate deep into the sample up to, e.g., a few 100 µm.

At the same time, the mutual guiding of the excitation beam and the ablation beam via the same scanning optic and focusing optic on the one hand can ensure that a systematic offset between the points, at which both beams arrive on the sample, may be reduced and/or minimized. On the other hand, the effort for tuning can be reduced and/or minimized. Thus, the successful use of the exemplary laser microscope does not require the user to be an expert in the field of laser microscopy. Instead, the exemplary laser microscope—including the new ablation function—can also be accessible to users who can be understood to be experts in the interpretation of the images, such as, e.g., doctors and/or biologists when used in clinical diagnostics. In particular, for such exemplary applications, it is furthermore advantageous that the mutual use of the scanning optical configuration and the focusing optical configuration for the excitation and/or ablation facilitates the integration of both functions into a compact device.

In nonlinear imaging, e.g., excited states in the sample material are generally changed by photons of the excitation beam. For example, the energy of the photon should match the energy difference between the excited states. Therefore, imaging utilizes the excitation beam having one or more specific wavelengths tuned to the sample material and also to the effect to be used for imaging. Nonlinear imaging facilitates both imaging and ablation with NIR-lasers, whereas the imaging methods likely generate signals in the visible range. This facilitates the same optical configuration to be used for both tasks.

In contrast to that, according to an exemplary embodiment of the present disclosure, the nonlinear ablation can be substantially independent of the wavelength of the ablation beam. The partial ionization of the electron shells of atoms of the sample material can be directly caused by the momentary electric field effecting the electrons. The frequency of oscillation of this electric field, and thus the wavelength of the ablation beam, may not be important. This wavelength is, thus, freely selectable based on practical and instrumental considerations, e.g., in the near-infrared (NIR) region, so as to facilitate a high penetration depth into the tissue.

As the excitation beam, on the one hand, and the ablation beam, on the other hand, interact with the sample in a qualitatively completely different way, this can mean that the pulses of the ablation beam should be significantly shorter than the pulses of the excitation beam to facilitate a low average power, such that no damage by the ablation laser occurs outside of the focus. For example, the maximum momentary intensity of an ablation pulse can be typically greater than the maximum momentary intensity of an excitation pulse by about a factor of approximately 1000. Accordingly, for example, an ablation pulse may have a pulse energy in the range between about 0.1 µJ and about 10 µJ at a pulse duration of about 100 fs, while an excitation pulse may, for example, have only a pulse energy in the range between about 1 nJ and about 10 NJ, at a pulse duration of about 10 ps.

One of the advantages of the integration of the laser microscope and the ablation tool in a single device can be that the ablation can be interrupted at any time, and visually verified by generating a new microscope image and/or the images of the procedure can permanently be taken during the ablation. In this exemplary manner, an online control in regard of the selectivity can be provided with which the sample material can be removed.

According to another exemplary embodiment of the present disclosure, at least one wavelength emitted by the second laser source can be congruent with at least one wavelength emitted by the first laser source. The refraction of light at the scanning optic, as well as the focusing of light by the focusing optic, can be wavelength dependent. For example, an excitation beam and/or the ablation beam with different wavelengths, which are guided in a mutual beam path in the scanning optic, can be shifted chromatically to each other and arrive with a spatial offset to each other on the sample. This chromatic shift can be minimized when the wavelengths of both beams are approximately identical.

Alternatively or in addition, both beams may also have different wavelengths. Such beams can then be merged with only small intensity losses in particular via a dichromatic beam splitter.

In a further exemplary embodiment of the present disclosure, the polarization directions of the first laser source and the second laser source can draw an angle between about 70 and 110 degrees. For example, both polarization directions can be orthogonal to each other. The excitation beam and the ablation beam may then be merged in particular via a polarization-maintaining beam splitter with only small intensity losses. The interaction of both beams, in particular with biological samples, which have no preferred crystalline direction, can be generally independent of the polarization direction. Furthermore, different polarization directions of the excitation beam and the ablation beam, when passing through the scanning optical configuration and the focusing optical configuration, do not cause an offset between the locations where both beams arrive on the sample.

In a still further exemplary embodiment of the present disclosure, the first laser source and the second laser source can be fed by a mutual continuous wave pump laser and/or a mutual pulsed pump laser source. Thus, the beam from the mutual continuous wave pump laser can be guided into an optical oscillator, which can also be, e.g., a fiber-optic oscillator, and a beam splitter configured to split the pulsed beam emitted by the optical oscillator into (i) the excitation beam on the one hand and (ii) the ablation beam. By the mutual usage of components for the excitation beam and for the ablation beam, cost savings, the installation space and energy consumption can be achieved. By using fiber optic components, a further installation space can be saved. Furthermore, the tuning can be significantly easier. If, due to the availability in the market, two separate optical oscillators for the two energetically very different beams are cheaper than an oscillator equally suitable for both beams, then it may also be advantageous to use two separate oscillators.

In yet another exemplary embodiment of the present disclosure, the excitation beam can be guided through a spectral filter. If, for example, the pulsed beam emitted by the optical oscillator has a very short pulse duration intended for the ablation beam, then the spectral filter causes, e.g., due to the Heisenberg uncertainty principle, the pulses of the excitation beam to be significantly extended. Further, the spectral filter can also maintain the components of the excitation bean (which may not be suitable for changing excitation states in the sample and thus likely only contribute to the heating of the sample) away from the sample.

In a yet further exemplary embodiment of the present disclosure, the first laser source can emit pulses with at least two different wavelengths. Additionally and/or alternatively, the first laser source can emit pulses with three different wavelengths. Such exemplary laser source can be suitable for coherent anti-Stokes Raman scattering. For this exemplary purpose, at least two of the emitted wavelengths can have a difference that matches the excitation of at least one vibrational state in a molecule of the sample material. For example, a first emitted wavelength can be tuned in the range between about 1025 nm and about 1075 nm, and a second emitted wavelength can be tuned in the range between about 800 nm and about 1000 nm. For example, different wavelengths may be generated by a four-wave mixture of wavelengths, distributed symmetrically around the wavelength of a pump laser used as an energy source. Ytterbium-doped fiber lasers are suitable for this purpose, for example. The four-wave mixing takes part in a photonic crystal fiber. The second laser source can, for example, be such a fiber laser, which wavelength can be tuned, fear example, in the range between about 1030 nm and about 1060 nm.

The detector can thus be configured to detect light, which can be formed from the excitation beam by coherent Raman scattering, e.g., stimulated Raman scattering (SRS) and/or by anti-Stokes Raman scattering.

The exemplary embodiment of the laser source described herein can be well suited for SRS imaging. With respect to the detection of SRS, modulations of the pump laser can be transmitted to the Stokes laser or vice versa by the nonlinear Raman interaction in the sample. The modulation transfer can be small, e.g., typically below $10^{-4}$ of the laser intensity. Therefore, low-noise lasers can be used, and other interference sources should be suppressed.

a) For this exemplary purpose, the exemplary laser pulses in the pulse range of 10 ps can be optimal, since an important interfering signal from SRS can be the cross-phase modulation, which is proportional to the time derivative of the field strength of the pulse. Therefore, the interfering signal should be significantly lower for long pulses.

b) Furthermore, it can be advantageous to use a stable laser. For example, when the modulation transfer on the Yb fiber laser is observed, it can be beneficial, because no nonlinear effects are used to generate this laser light, and therefore the noise can be minimal. The use of the signal or idler generated by four-wave mixing, would be less desirable.

c) it may also be advantageous not to detect the pump laser, since the interfering signals can occur due to transient absorption. At SRS detection on the pump laser, SRL is detected, which can be equivalent to TA signals (e.g., stimulated Raman Loss). These interfering signals can be avoided by NIR-lasers and by the detection of Raman gain at the Stokes laser instead of Raman loss.

d) Additionally, it can be advantageous to use a laser with (e.g., almost) fixed central frequency. When using the Yb laser, the SRS signal can also be detected when tuning the Raman resonance, since the Yb wavelength can be varied by about 50 nm, while the signal wavelengths can be tuned in a larger range of about 200 nm and/or the Raman resonance of about 700-3300 $cm^{-1}$.

In a further exemplary embodiment of the present disclosure, the wavelength emitted by the first laser source and/or by the second laser source can be between about 750 nm and about 3 µm, preferably between about 750 nm and about 2 µm, and particularly preferably between about 750 nm and about 1.5 µm. This exemplary wavelength range can be advantageous for the examination and modification of biological samples, since scattering losses in the tissue can be minimized, and the light can penetrate into the sample up to, e.g., a few 100 µm.

According to still another exemplary embodiment of the present disclosure, a method can be provided for operating the laser microscope, whereas, in the laser microscope, e.g., an pulsed, excitation beam and/or a pulsed ablation beam can be guided to the sample. A configuration for scanning the excitation beam and the ablation beam over the sample can be provided. In the exemplary laser microscope, at least one detector can be provided for light detection, which the sample emits due to a nonlinear optical effect in response to the excitation beam when the beam impacts the sample.

In one example, the pulse duration of the ablation beam can be selected to be between about 35 fs and about 300 fs, and preferably between about 100 fs and about 300 fs.

With a pulse duration in this range, a local ablation of the sample material can take place, e.g., without the sample being excessively heated. As indicated herein, the sample material can be vaporized by the momentary electric field of the ablation pulse partially ionizing the electron shells of atoms of the sample material. This exemplary effect can only occurs starting at a certain minimum field strength, which can be sufficient to overcome the binding energy of at least the outer electrons. This exemplary minimum field strength corresponds to a minimum value for the momentary intensity of the ablation pulse (in the region of $10^{12}$-$10^{14}$ $W/cm^2$). The momentary intensity should reach this exemplary minimum value in the course of the ablation pulse in a rising edge and fall again in a falling edge at the end of the pulse in such an expedited manner that on these flanks no other, a thermal interaction of the ablation pulse with the sample material takes place, respectively. The ablation pulse should therefore rise and fall again on a faster time scale than is needed to excite vibrations and/or rotations in molecules of the sample material, and thus couple heat into the sample material. If such exemplary excitation of vibrations takes place, the sample can likely be highly heated so that it is destroyed. The selective ablation can be due to the fact that during the phase of the pulse, in which a direct ionization of the electron shells of atoms takes place, at least a magnitude of energy more is coupled into the sample than during the rising and falling edges of the pulse, during which, the momentary intensity is not sufficient for a direct ionization. If the samples are locally ablated with pulses according to the exemplary embodiments of the present disclosure, this can be done, for example, even with average power of the ablation beam being in the order of about 1 mW.

In a still additional exemplary embodiment of the present disclosure, the pulse duration of the excitation beam for the imaging can be selected to be longer by a factor between 10 and 1000 than the pulse duration of the ablation beam. In this exemplary manner, it can be ensured that the excitation beam on the one hand does not ablate material by a direct ionization, and that sufficient time is available to generate a specific excited state in the sample by the interaction of the photons of the excitation beam with the sample. The qualitative difference between the effects of the excitation beam and the ablation beam can be based on the different time scales and intensity scales, on which these effects take place.

It can be advantageous for the pulse duration of the excitation beam to be selected from a range between about 1 ps and about 100 ps, preferably between about 5 ps and about 40 ps, and even more preferably between about 10 ps and about 20 ps. In this region, the tuning of the excitation beam can be the easiest. Furthermore, even the ranges between about 5 ps and about 40 ps, or between about 10 ps and about 20 ps, can be particularly advantageous when the excitation beam is guided through at least one optical fiber, for example, when the first laser source is a fiber laser. Optical fibers typically have a dispersion of about 10 ps per meter in length for the two wavelengths required for imaging. From about 10 ps pulse duration, the dispersion in the optical fiber, combined with the dispersions in the scanning optic and in the focusing optic of the microscope, can be low enough to no longer decisively influence the choreography of a spectroscopy with excitation by a pump pulse and probing by a probe pulse (pump probe spectroscopy), when parts of the microscope optic such as lenses, scan lens, tube lens or condenser are changed. In addition, the range between about 5 ps and about 40 ps can be optimal in view of the spectral resolution coupled directly to the pulse duration by the Heisenberg uncertainty principle, and at the same time, can ensure pulse peak powers in the range of kW required for nonlinear processes at average powers in the range of some about 10 mW at pulse frequencies above about 1 MHz, which can be sufficient for imaging.

It can be further advantageous for the repetition rate of the pulses of the excitation beam to be selected to be between about 1 MHz and about 40 MHz, and preferably between about 1 MHz and about 20 MHz. This range can be an optimal compromise between a highest possible speed of image recording on the one hand, and the lowest possible heating of the sample on the other hand. For video refresh rates, at least 8 million pulses per second may be needed. While in ablation the energy coupled into the sample can be dissipated substantially directly with the vaporized material and barely leaves heat in the sample, the excitation beam heats the sample according to its average power. At least one pulse of the excitation beam should be used for the recording of each image pixel. Depending on the signal-to-noise ratio of the effect selected for the imaging, it may also be advantageous to provide several pulses of the excitation beam per image pixel in order to obtain better statistics.

Further, it can be advantageous for the repetition rate of the pulses of the ablation beam to be selected to be between about 100 kHz to about 10 MHz, and preferably between about 100 kHz and 1 MHz. For ablating larger structures in a short time, the ablation beam may, for example, be configured such that each pulse can be effective in a region comprising a plurality of image pixels, for example, about 10 image pixels of the image recorded with the excitation beam. The ablation beam can then be scanned faster, e.g., in a wider meshed grid of grid points, over the sample. Preferably, the regions, in which each ablation pulse removes material from the sample, can be gaplessly assembled to the structure to be ablated. In this exemplary case, during the removal of the structure, for example, the focus region of the ablation beam can be varied in size, for example, first to remove large-area structures at high speed, and then to rework fine structures with a better accuracy.

The image field of the laser microscope may, for example, have an area of about 1 mm$^2$. For example, a spatial resolution of better than about 1 µm laterally, thus along the surface of the sample, can be achieved. Axially, e.g., in a depth below the surface of the sample, a resolution of better than about 5 µm can be typically achievable. Using the ablation beam, material with a resolution of typically about 1-1000 µm$^3$ can be removed.

In a further exemplary embodiment of the present disclosure, the image obtained by scanning the excitation beam can be analysed using, e.g., at least one multivariate classifier, to determine if the sample has a predetermined structure or characteristic. For this exemplary purpose, for example, the exemplary classifiers described in European Patent Application 15 200 864.5 may be utilized.

For many applications, a large canon of multivariate classifiers can be available. Thus, the classifiers to be used can be selected, for example, after the appropriate analysis time in order to complete the analysis within a predetermined time.

Furthermore, in vivo biological applications, where motion artifacts can occur, there may be minimum scan speed limits to reduce or minimize motion artifacts. Increased speed may then add an increased noise. This noise can affect different multivariate classifiers to different extent. In order to evaluate the reliability of the possible classifiers under the influence of image noise, the image obtained by scanning the excitation beam can be changed in a further exemplary embodiment of the present disclosure by superimposing noise on a test image. By comparing the results that the classifier provides, when applied to the image on the one hand and the test image on the other hand, the reliability of the classifier can be analysed.

For example, a classifier that changes its decision at a minor additional noise may be rated less reliable than a classifier that changes its opinion only at very high additional noise. The reliability thus determined would typically depend on the type and intensity of noise contained in the image recorded by the laser microscope. The noise, e.g., depends on the speed of the image recording. By making the reliability quantitatively verifiable by adding additional noise, the user of the laser microscope can select an optimal compromise between the speed of image recording on the one hand and the usability of as many significant classifiers as possible on the other hand.

It can be advantageous to provide an exemplary method using a laser microscope according to an exemplary embodiment of the present disclosure. The exemplary laser microscope can be configured and/or designed to be operated by the method according to the exemplary embodiment of the present disclosure, and vice versa.

One exemplary application of the laser microscope and method according to the exemplary embodiments of the present disclosure can be or include the SRS or CARS guided fs-laser ablation of tissue for microsurgical operations based on the combination of the multimodal nonlinear microscopy (SRS, CARS, TPEF, SHG), the stimulated Raman-Scattering microscopy (SRS microscopy) and/or the coherent anti-Stokes Raman scattering microscopy (CARS microscopy) of tissue for a local diagnosis and characterization of the tissue with the targeted removal of parts of the tissue by fs-laser ablation. For example, main components in this exemplary application can be or include the method of data collection and data processing, the combination of the imaging method with a method for tissue ablation, and the exemplary laser source used for this exemplary purpose. The exemplary method facilitates the imaging and the molecular sensitive detection of target structures in the tissue without the use of external marker substances and the subsequent precise removal of the target structures. Tissue down to a depth of, e.g., a few 100 μm can be displayed non-destructively and three dimensionally and tissue down to a few 100 μm below the surface can be selectively ablated, e.g., without creating an open wound. This can significantly reduce the risk of infection. The exemplary method can be used for all body regions that are accessible to microscopes, e.g., skin, as well as for surgical procedures performed with surgical microscopes, e.g., in the ear-nose-throat-region done with flexible or rigid imaging endoscopes.

The exemplary application can combine marker free molecular imaging for the localization of disease related tissue anomalies with fs-laser ablation for targeted ablation. This combines diagnostics and therapy in one device, which contributes to faster treatment. Furthermore, the fs-laser ablation can facilitate a more precise removal of target structures and can also be used in endoscopes and microendoscopes. Thus, the exemplary method can be advantageous, e.g., in the environment of physiologically important tissue structures, for example, in the larynx near the vocal cords or in the brain.

The previous gold standard was based on the extraction and histological processing of tissue biopsies to diagnose the disease and possibly subsequent surgery, if the examination hardens the suspicion of a serious disease. Based on the extracted material, thin tissue sections were prepared and stained histologically, especially by means of hematoxylin-eosin staining. The stained tissue section was evaluated by a pathologist. This established method was time consuming and could take several days. The accuracy of conventional surgical procedures and operations was limited to approximately 100 μm.

Due to the time consuming sample processing, the surgical success could not already be checked during the operation, so that partly costly repetitive surgeries were necessary. In most cases, tissue was removed generously, which increased the risk of infection and could damage important physiological structures.

According to the exemplary embodiments of the present disclosure, a combination of a marker free imaging method can be provided that can directly visualize molecules with an optical tissue ablation method. Specific laser parameters can facilitate a high penetration depth of several 100 μm for both imaging and laser ablation. The exemplary method can be significantly faster and more accurate than the conventional methods.

The exemplary workflow using the exemplary apparatus and method according to the exemplary embodiment of the present disclosure can comprise:
(i) displaying the target region using a multimodal nonlinear microscopy, e.g., the coherent anti-Stokes Raman scattering microscopy (at one or more vibration frequencies) alone or in combination with the two-photon fluorescence and the second harmonic;
(ii) providing the multivariate analysis of the image data for identifying the target region for the laser ablation (based, for example, on the disclosure of European Patent Application 15 200 864.5); and
(iii) providing the local ablation of target tissue and tissue structures in vivo/ex-corpore-in-vivo/in-vitro/ex-vivo, even below an intact tissue layer.

The exemplary benefits in this exemplary workflow can be the combination of tissue measurement and display with the multimodal nonlinear microscopy (e.g., SRS, CARS, TPEF, SHG) with laser ablation for targeted tissue ablation. The laser scanning microscope in combination with the compact laser source for SRS and CARS imaging and the laser ablation can be an important instrument in this exemplary context. The exemplary combination of both methods, as well as the construction of a compact, air-cooled high-performance ablation laser, are certainly beneficial.

Furthermore, it is believed that neither the coherent Raman microscopy nor the multimodal nonlinear microscopy have been previously used intraoperatively. It is further believed that applications in animal experiments have also been limited to imaging. According the exemplary apparatus and method which couples optical methods for targeted tissue removal and online control of surgical progress is believed to be beneficial and novel.

Compared with the use of coherent Raman microscopy and multimodal nonlinear microscopy for frozen section diagnostics, such as described in European Patent Application 15 200 864.5, the following differences can be important:

Examination of extended intact tissue samples, no thin frozen sections on object slides Detection of the signals in reflection: since for extended tissue structures no signal detection in the forward direction may be possible, the signals must be detected in the reverse direction Examination of tissue in real time: since motion artifacts occur, examinations can be performed at a higher speed compared to histological frozen section diagnostics, which can result in a higher noise and the automated data analysis is limited to a few important parameters Real-time analysis: online data processing directly after data collection Excitation: NIR laser, 750-1500 nm—in order to achieve a high penetration depth, a long-wave illumination for imaging and fs ablation can be chosen, in particular to minimize scattering losses in the tissue.

According to the exemplary workflow using the laser microscope and the method according to the exemplary embodiments of the present disclosure, the following significant advantages can be present:

Pathological tissue structures can be detected in vivo and be visualized, so that a distinction to the surrounding healthy tissue can be made visible.

Pathological tissue structures can be selectively removed with μm spatial resolution, even in 3D and surrounded by healthy tissue.

The exemplary workflow can also be used for important operations on physiologically important structures, as it can be operated with a high precision, and the targeted structures can be displayed in high contrast. There is no need to utilize contrast agents.

Since the examination can be carried out directly in the operating room, the exemplary apparatus and method can save time and resources by reducing or eliminating the need for biopsy and evaluation. Since the success of the surgery can be reviewed immediately, a repetitive surgery can be reduced or avoided, which can result in significant cost savings in the surgical patient care.

BRIEF DESCRIPTION OF THE DRAWINGS

Further exemplary embodiments of the present disclosure are detailed in the description of the Figures, where this description shall not limit the scope of the exemplary embodiments of the present disclosure. The Figures show:

FIG. 3b which is a block diagram of an internal structure of an exemplary mutual laser of the laser microscope shown in FIG. 3a.

Figure 1:
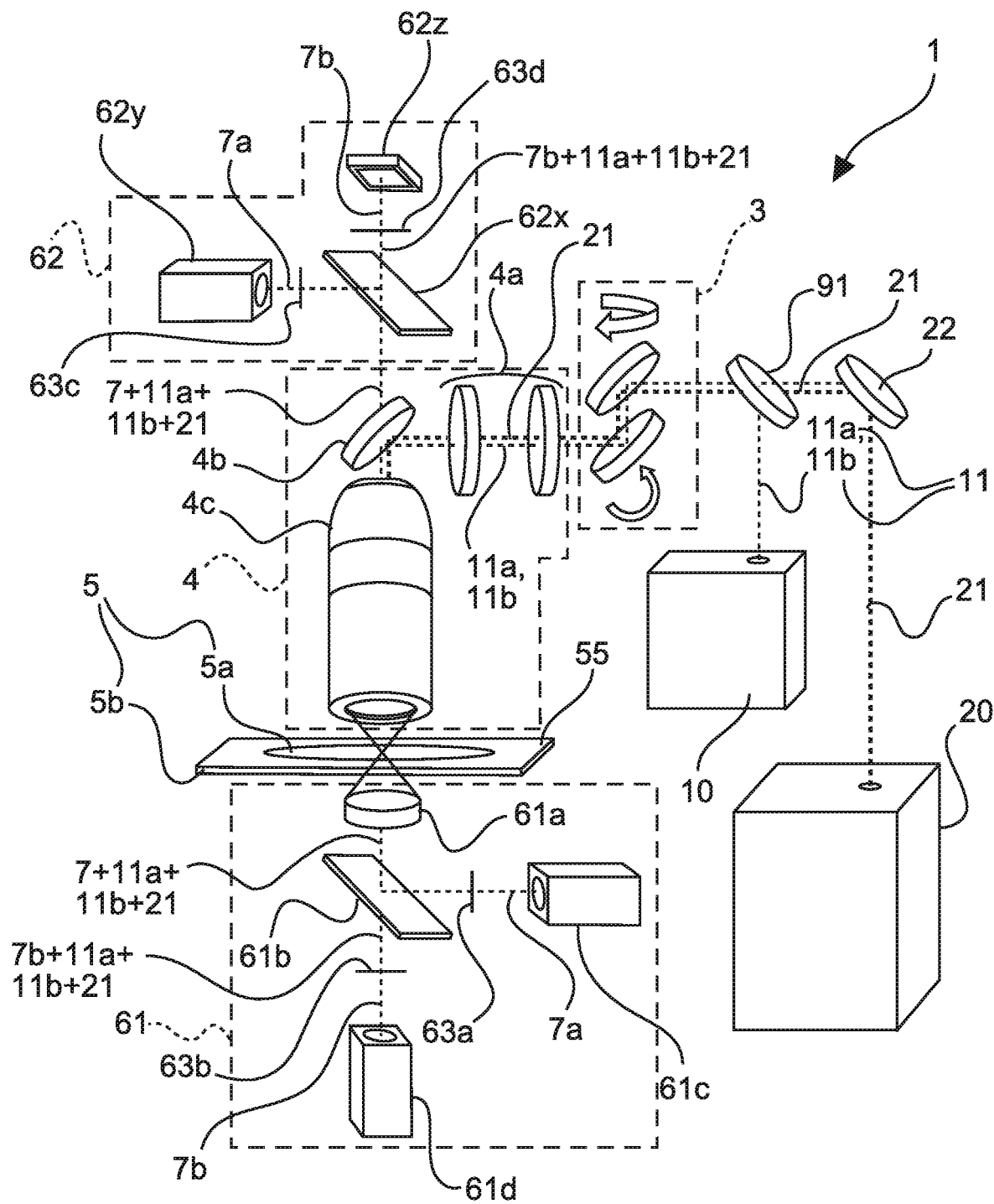
FIG. 1 which is a diagram of the laser microscope an exemplary embodiment of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure as defined by the appended claims.

DETAILED DESCRIPTION OF EXEMPLARY EMBODIMENTS

FIG. 1 shows a laser microscope 1 in accordance with a first exemplary embodiment of the present disclosure. For example, a first laser source 10 of the laser microscope 1 can emit an excitation beam 11 of pulses 11a at a first wavelength and pulses 11b at a second wavelength. The difference between the wavelengths of the pulses 11a and 11b can correspond to the frequency of a vibration in biological sample material 5a. A dichroic beam splitter 91 can direct the excitation beam 11 in the direction of the scanning optical configuration (e.g., optics) 3. A second laser source 20 can emit an ablation beam 21 of pulses at a further wavelength. The ablation beam 21 can also be guided unto the scanning optical configuration (e.g., optics) 3 via a mirror 22 and the dichroic beam splitter 91.

The excitation beam 11 and the ablation beam 21 can be guided mutually by the scanning optical configuration 3 unto the focusing optical configuration 4, which can comprise a scanning and tube lens system 4a, a further dichroic beam splitter 4b and an object lens 4c. The beams 11, 21 can be focused together on the biological sample material 5a, which can be applied as a thin layer on an object slide 5b, and can form the sample 5 together with the object slide 5b. The surface 55 of the sample 5 can be approximately planar.

Portions(s) of the light 11a, 11b, 21 beamed onto the sample 5 as well as of the Raman-scattered light 7 coherently emitted by the sample 5 can be transmitted and passed unto a first multimodal CARS detector 61. In the CARS detector 61, e.g., the entire light 7,11a, 11b, 21 can initially pass through a condenser 61a, and converted into a parallel beam path. A dichroic beam splitter 61b can separate the coherent anti-Stokes Raman scattered light 7a, and guide it to a first photomultiplier 61c via a dielectric filter 63a, which can hold back the remaining components of all laser beams 11a, 11b and 21. The light transmitted by the beam splitter 61b can contain a further signal component 7b, which can be based on two-photon excitation fluorescence (TPEF), second harmonic generation (SHG) or another freely selectable optical effect. This signal component 7b can be separated from the laser beams 11a, 11b, 21 by a further dielectric filter 63b, and guided to a second photomultiplier 61d. If the dielectric filter 63b is removed, optionally, the laser light 11a, 11b, 21 can be monitored for intensity fluctuations with the second photomultiplier 61d.

The dielectric filters 63a, 63h typically have an optical density of 6 for the laser wavelengths used. These dielectric filters 63a, 63h may optionally be complemented by another short-pass filter, not shown in FIG. 1, which can be arranged between the condenser 61a and the dichroic beam splitter 61b.

The light 7, 11a, 11b, 21 reflected from the sample can pass through the beam splitter 4b, and enter or be provided to the second multimodal CARS detector 62. In the second CARS detector 62, the Raman scattered portion 7a of the light can be separated with a dichroic beam splitter 62x and guided onto a photomultiplier 62y via a dielectric filter 63c, which can hold back, e.g., the remaining components of all laser beams 11a, 11b and 21. Similarly, the first CARS detector 61 operated in the transmission configuration, the light transmitted by the beam splitter 62x can contain the signal component 7b. This signal component 7b can be separated by a further dielectric filter 63d from the laser beams 11a, 11b, 21, and be passed to a photodiode 62z. When the dielectric filter 63d is removed, the photodiode 62z can be used to monitor the laser beams 11a, 11b, 21 for intensity fluctuations or, for example, to normalize the Raman spectres to the total intensity. Due to its larger dynamic range, the photodiode 62z can be better suited for this purpose than a photomultiplier 61a, 61b, 62y. In addition, the photodiode 62z may be used with a suitable filter for a laser wavelength for SRS detection, in combination with a lock-in amplifier or a tuned amplifier.

As photomultipliers 61a, 61b, 62y, conventional photomultipliers with secondary electron multipliers can be used. Alternatively or in addition, hybrid detectors may be used instead. In such exemplary hybrid detectors, primary electrons can be generated in a cathode, which, for example, may include gallium arsenide phosphide. The primary electrons can then be accelerated by a significantly higher voltage (e.g., about 5-10 kV) compared to conventional photomultipliers onto a material that releases secondary electrons. The secondary electrons can then be guided to a diode, and converted by this diode into a current pulse.

Figure 2A:
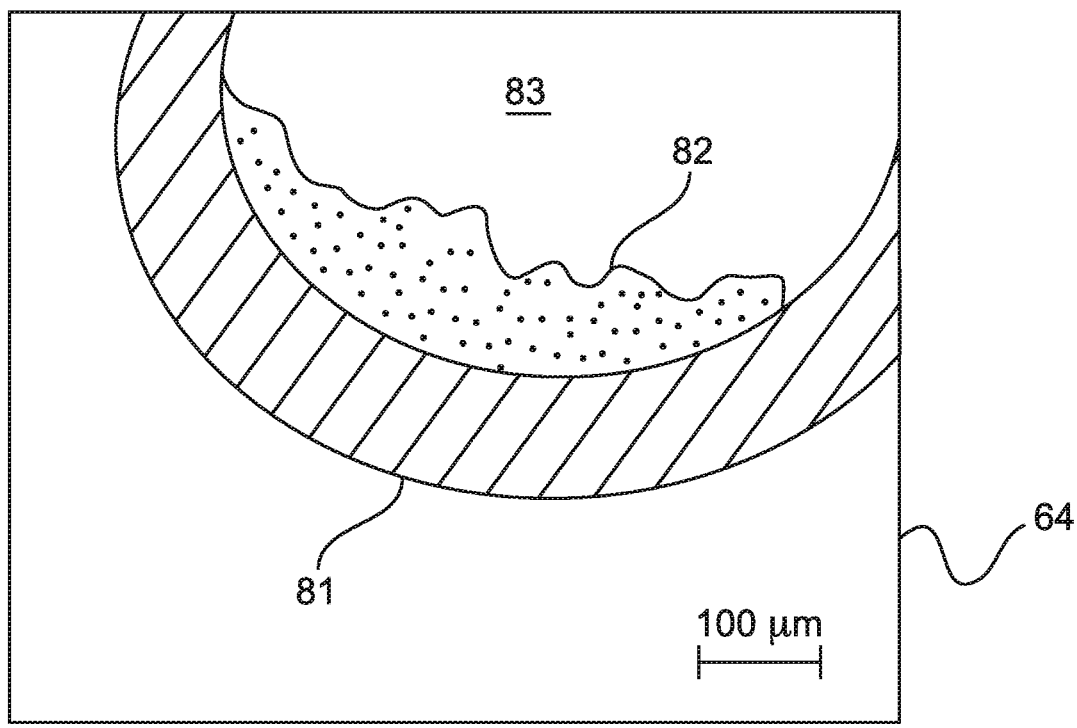
FIGS. 2a and 2b which are illustrations of a selective removal of a deposit from an arterial wall, according to an exemplary embodiment of the present disclosure.
Figure 2B:
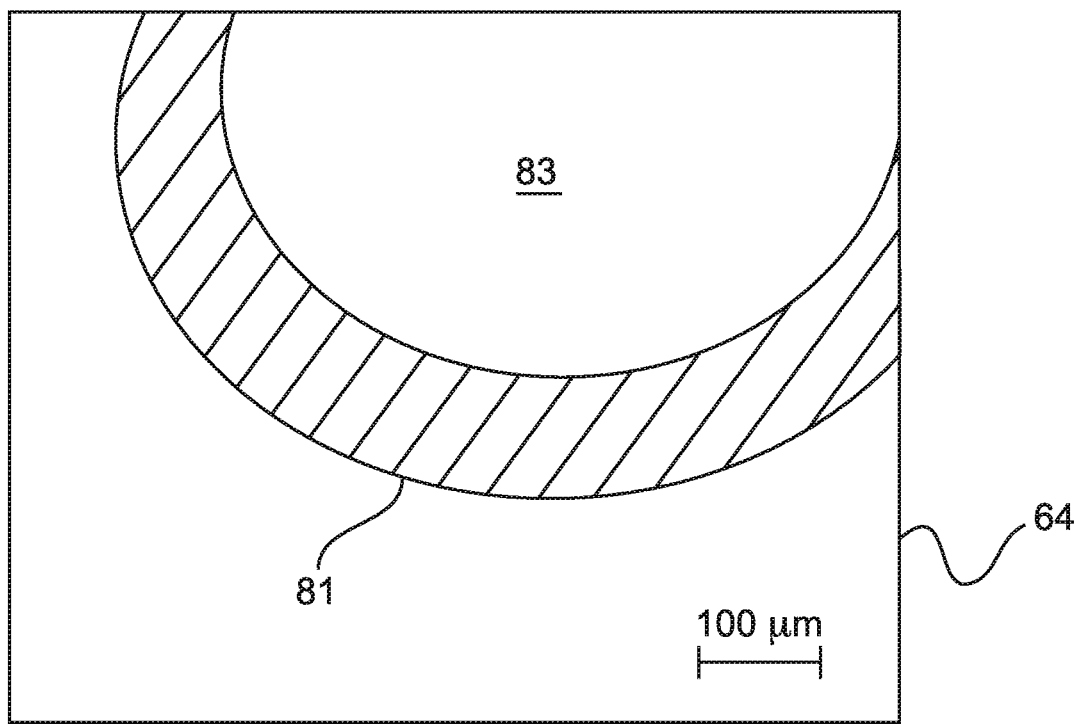

FIGS. 2a and 2b show illustrations of a selective ablation with the ablation beam 21. For example, FIG. 2a provides an illustration of a first image 64 of a thin section of an arterial wall 81 recorded with the exemplary laser microscope 1 illustrated in FIG. 1. In the interior 83 of the artery, deposits 82 have been deposited on the inside of the arterial wall 81. FIG. 2b provides and illustration of a further image 64 of the same image field after the selective removal of the deposits 82 with the ablation beam 21. As shown in FIG. 2b, the arterial wall 81 itself is undamaged.

The real CARS images for a vibration resonance of 2850 $cm^{-1}$ underlying the illustrations of FIGS. 2a and 2b can be understood as a "proof of concept" for the principal feasibility of selective tissue removal. In the actual in vivo application, the sample, including the structures to be ablated, is likely not a thin section but a three-dimensional object.

Figure 3A:
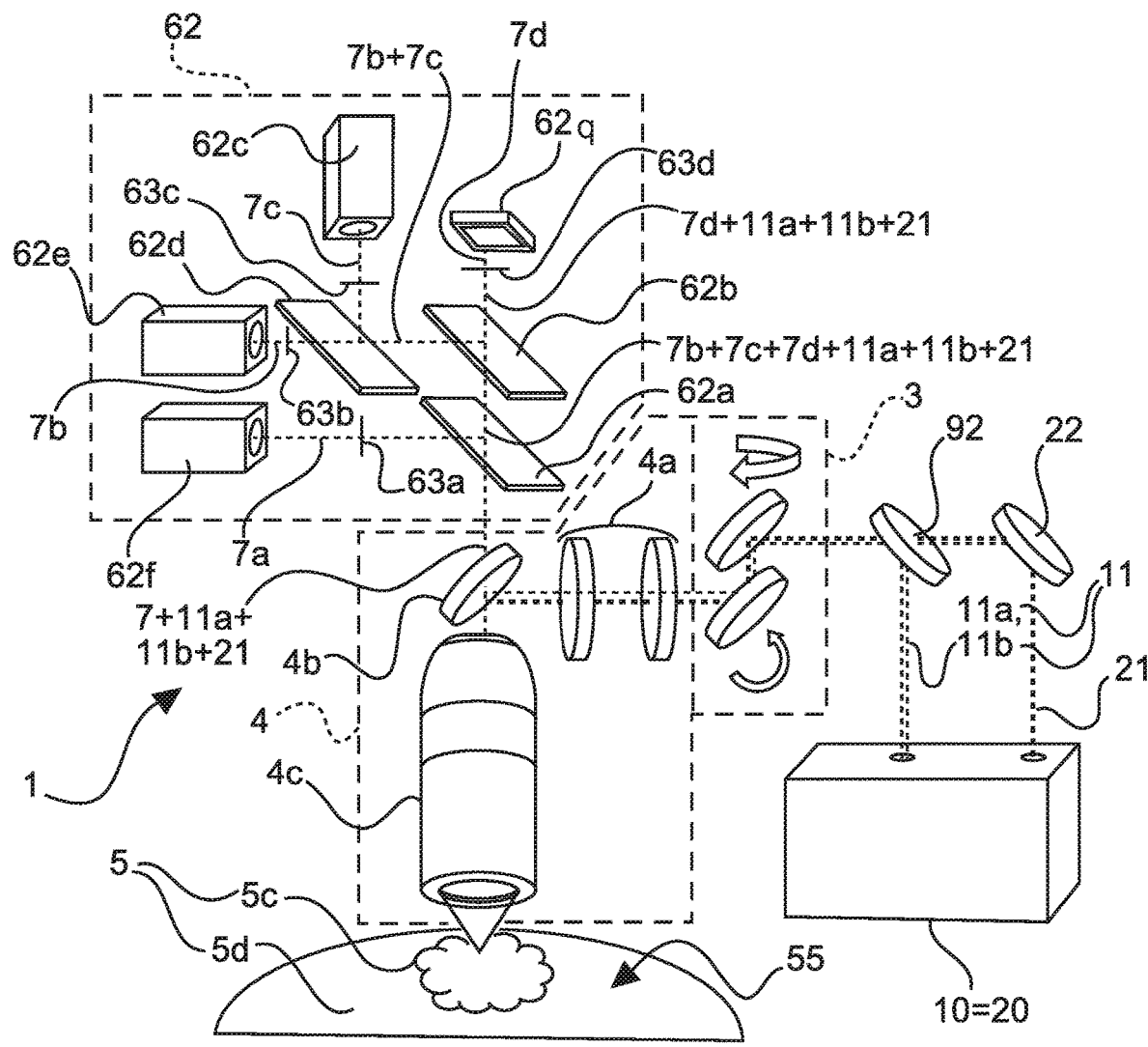
FIG. 3a which is a diagram of the laser microscope according to another exemplary embodiment of the present disclosure.

The laser microscope 1 adapted to the real in vivo application according to a second exemplary embodiment of the present disclosure is shown in the diagram of FIG. 3a. In contrast to the first exemplary embodiment illustrated in FIG. 1, a single laser 10=20 of the second exemplary embodiment provided in FIG. 3a is provided as the mutual source for the excitation beam 11 and the ablation beam 21. This mutual laser 10=20 is significantly more compact than the arrangement of two separate exemplary lasers 10, 20 illustrated in FIG. 1.

Figure 3B:
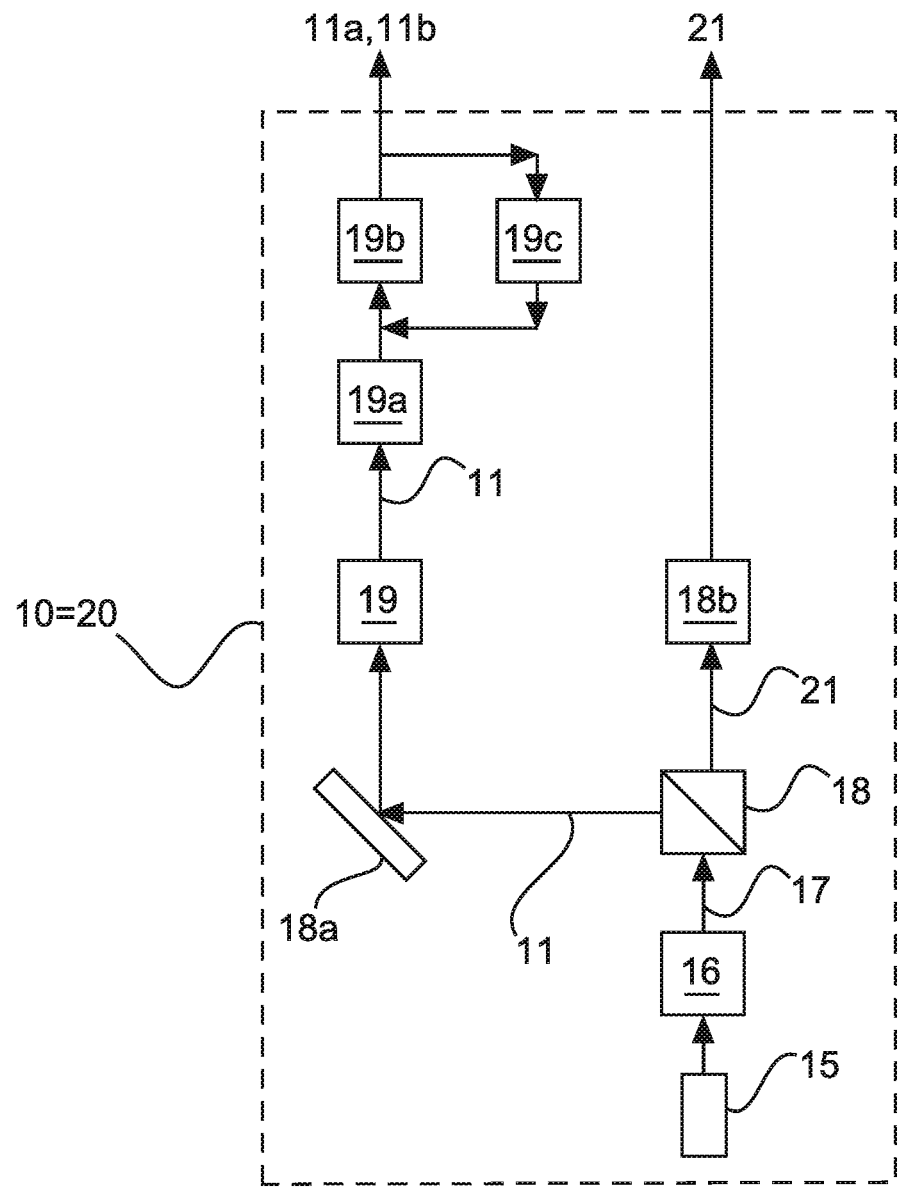

Furthermore, in contrast to the first exemplary embodiment of FIG. 1, the ablation beam 21 provided in FIG. 3b has a wavelength, which is also contained in the excitation beam 11. The polarization direction of the ablation beam 21 shown in FIG. 3a is at least approximately orthogonal to the polarization direction of the excitation beam 11. Therefore, the excitation beam 11 and the ablation beam 21 are merged via a polarization maintaining beam splitter 92, according to the diagram of FIG. 3b.

Further, as shown in FIG. 3a, the excitation beam 11 and the ablation beam 21 can be guided to the sample 5 via the mutual scanning optical configuration 3 and the mutual focusing optical configuration 4, similar to the optical configurations of FIG. 1. FIG. 3a illustrates that the sample 5 is a three-dimensional tissue object 5d, on which a structure 5c to be ablated is indicated. Accordingly, the surface 55 of the sample 5 is also three-dimensional.

In contrast to the first exemplary embodiment of FIG. 1, the sample 5 provided in the second exemplary embodiments of FIG. 3a is not transparent. Therefore, only the reflection can be measured. For example, in this second exemplary embodiment, the light 11a, 11b, 21 reflected by the sample 5, passes through the beam splitter 4b of the focusing optical configuration 4 together with the signal light 7 generated by the sample 5, and passes to the single multimodal CARS detector 62. In this CARS detector 62, the various signals, e.g., the Raman scattered light 7a, SHG signals 7b, TPEF signals 7c, a further signal component 7d, as well as the laser light 11a, 11b, 21 with a plurality of cascaded dichromatic beam splitters 62a, 62b and 62d as well as matching dielectric filters 63a, 635, 63c and 63d are separated.

The first dichroic beam splitter 62a can split off a first wavelength component 7a of the signal light 7, and guide it to the photomultiplier 62f via the dielectric filter 63a. The remaining wavelength components 75, 7c, e.g., TPEF and SHG, the reflected excitation light 11a, 11b as well as the reflected ablation beam 21 can pass through the first dichroic beamsplitter 62a unhindered in the forward direction (e.g., vertically upwardly as shown in FIG. 3a).

The second dichroic beam splitter 62b splits off a second wavelength component 7b and a third wavelength component 7c of the signal light 7. These two wavelength components 7b and 7c are then separated from one another in a third dichroic beam splitter 62d and guided to the photomultipliers 62e, 62c via dielectric filters 635 and 63c, which respectively pass, e.g., only the wavelength components 7b, 7c and hide further spectral components. The reflected excitation light 11a, 11b as well as the reflected ablation beam 21 again pass unhindered through the second dichroic beam splitter 62b together with another signal component 7d. The dielectric filter 63d hides the laser light 11a, 11b, 21, so that only the signal component 7d reaches the photodiode 62q. Optionally, the dielectric filter 63d may be removed so that the photodiode 62q may be used to measure the intensity of the laser light 11a, 11b, 21. This intensity can then be used similarly to the first exemplary embodiment of FIG. 1 for controlling and normalizing the Raman and other nonlinear signals td the total intensity.

One of the advantages of the CARS detector 62 shown in FIG. 3a can be that four wavelength components 7a, 7b, 7c, 7d of the signal light 7, e.g., CARS, SHG, TPEF and another freely selectable signal component, can be registered at the same time. These exemplary wavelength components 7a, 7b, 7c, 7d can be generated really simultaneously by the sample. However, they can also be generated successively, for example by tuning the wavelengths of the pulses 11a, 11b, which form the excitation beam 11.

FIG. 3b shows the internal structure of the exemplary mutual laser 10=20 illustrated in FIG. 3a. This exemplary laser 10=20 can be described such that most of the optical components are used both for the excitation beam 11 and for the ablation beam 21. The beam from a mutual continuous wave pump laser 15 can be guided into an optical oscillator 16, and converted there into pulses with the pulse duration suitable for the ablation beam 21. The beam 17 formed by these pulses can be guided from the optical oscillator 16 to a beam splitter 18.

The beam splitter 18 passes the ablation beam 21 in the forward direction (shown as being vertically upward in FIG. 3b). The ablation beam 21 can be amplified by an amplifier 18b, and can finally exit the exemplary laser 10=20.

The excitation beam 11 can be guided laterally to a mirror 18a, and from there to a spectral filter 19. Due to the Heisenberg uncertainty principle, the spectral filter 19 causes the pulses of the excitation beam 11 to be significantly longer. The excitation beam 11 is initially amplified in an amplifier 19a.

In a photonic crystal fiber 19b, two further wavelengths, signal and idler, can then be generated from the excitation beam 11, which has, e.g., only one frequency $\omega_0$ behind the spectral filter 19, via four-wave mixing. Due to the nonlinear process of four-wave mixing, two photons of the excitation beam with frequency $\omega_0$ generate a pair of a signal-photon with frequency $\omega_0+\Delta\omega$, and an idler-photon with frequency $\omega_0-\Delta\omega$. The photonic crystal fiber 19b can be microstructured such that, despite the dispersion in the crystal fiber 19b, the conservation of energy and momentum are provided.

In the photonic crystal fiber 19b, photonic pairs $\omega_0\pm\Delta\omega$ with many frequency shifts $\Delta\omega$ are generated in broadband. Such that exactly one frequency shift $\Delta\omega$ is preferred, and thus pulses 11a, 11b with exactly two frequencies (and thus two wavelengths) exit the exemplary laser 10=20, a component of the light exiting the photonic crystal fiber 19b can be fed back via a resonant cavity 19c into the photonic crystal fiber 19b. For example, the cavity 19c can always be resonant only on one frequency, e.g., either on the frequency $\omega_0+\Delta\omega$ or on the frequency $\omega_0-\Delta\omega$. By determining the frequency shift $\Delta\omega$ in such exemplary manner, both frequencies of the photon pair $\omega_0\pm\Delta\omega$ can be determined, which should preferably be formed. The frequency shift $\Delta\omega$ can be tuned by the resonance of the cavity 19c.

Figure 4:
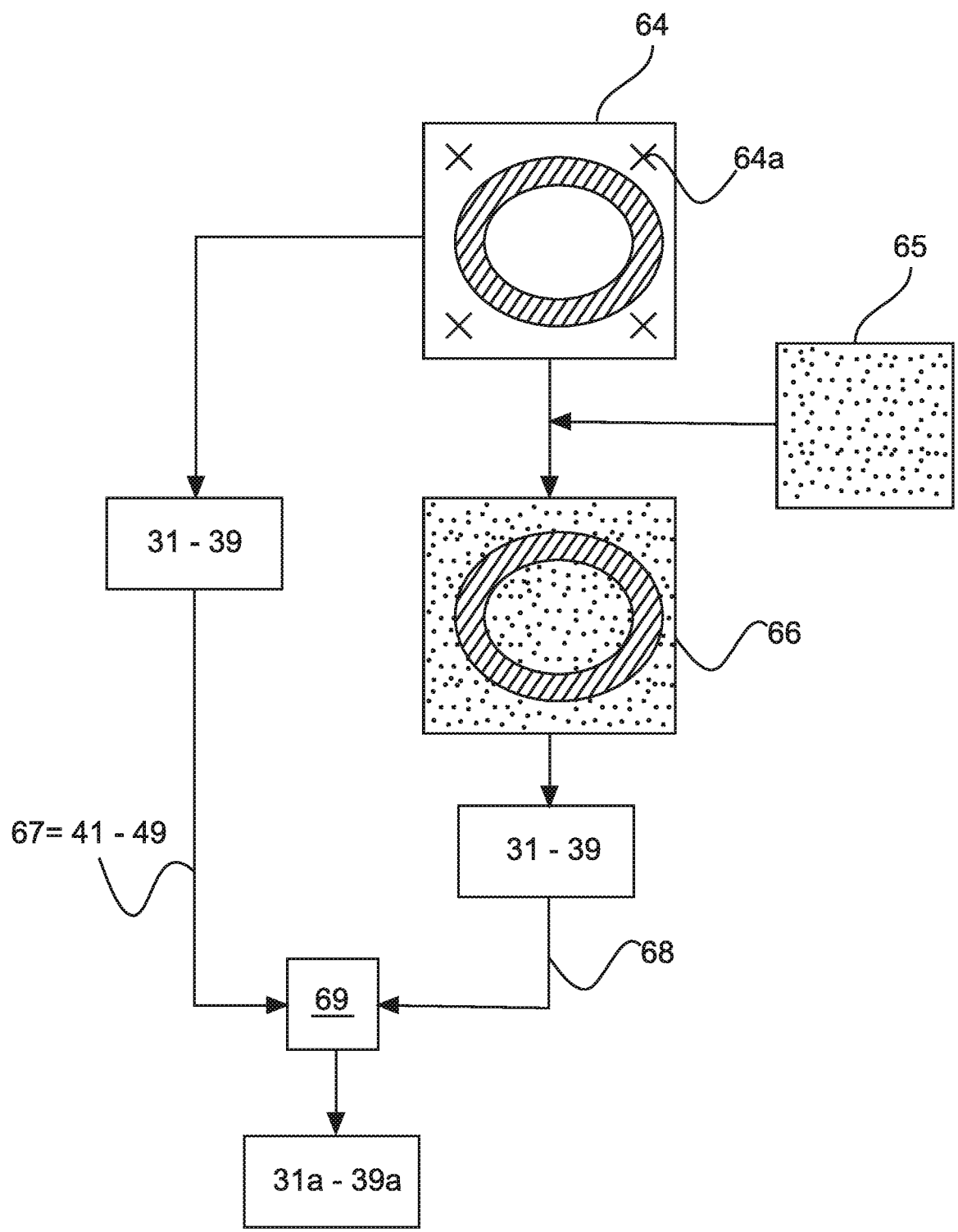
FIG. 4 which is an illustration of an exemplary testing of a reliability of a multivariate classifier by a superposition with test noise, according to an exemplary embodiment of the present disclosure.

FIG. 4 shows a diagram of how classifiers 31-39 can be evaluated, whether they are suitable for detecting a given structure or characteristic 41-49 in a specific noise-afflicted image 64, which has been recorded with the exemplary laser microscope 1, according to an exemplary embodiment of the present disclosure. For example, the image 64 can be changed to a test image 66 with additional test noise 65. The classifier 31-39 can be applied to the original image 64, and provides a result 67, which can include the determination of whether the structure or property 41-49 is present on the sample 5 according to the original image 64. The classifier 31-39 can be applied in parallel to the test image 66, and provide a result 68. The two results 67, 68 can be compared at block 69. Based on such comparison, the reliability 31a-39a of the classifier 31-39 can be evaluated. This reliability 31a-39a may depend, e.g., on the strength of the additional noise 65a from which the classifier 31-39 changes its opinion. If a slight additional noise is already sufficient for this purpose, then it can be concluded that possibly the original noise 64a in the image 64 has already corrupted the result 67 provided by the classifier 31-39. On the other hand, if the opinion of the classifier 31-39 does not change even with strong noise, it can be concluded that the classifier is particularly resistant to noise and thus particularly reliable.

According to the exemplary embodiment of the present disclosure, a laser microscope can be provided which comprises at least one first laser source that emits at least one (e.g., pulsed) excitation beam, a scanning optical configuration (which is configured to scan the excitation beam over the surface of a sample), a focusing optical configuration (which is configured to focus the excitation beam onto the sample), and at least one detector for detecting light, whereas the sample emits the light due to an optical effect in response to the excitation beam. For example, a second laser source can generate and/or provide a pulsed ablation beam that is provided for local ablation of the material of the sample. The ablation beam can be guided to the sample via the scanning optical configuration and the focusing optical configuration.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY LIST OF REFERENCE SIGNS 1 laser microscope
10 first laser source for excitation beam 11
11 excitation beam
11a, 11b pulses of the beam 11 with different wavelengths
15 mutual continuous wave pump laser for lasers 10, 20
16 optical oscillator
17 beam of optical oscillator 16
18 beam splitter for splitting beam 17 into beams 11, 21
18a a mirror for deflecting the excitation beam 11
18b amplifier for ablation beam 21
19 spectral filter for excitation beam 11
19a amplifier for excitation beam 11
19b photonic crystal fiber for forming of photon pairs $\omega_0 \pm \Delta\omega$
19c resonant cavity for the selection of a frequency shift $\Delta\omega$
20 second laser source for ablation beam 21
21 ablation beam
22 mirror for ablation beam 21
3 scanning optic or means for scanning
31-39 multivariate classifiers
31a-39a reliability of multivariate classifiers 31-39
4 focusing optic
4a scan and tube lens system
4b beam splitter in focusing optic 4
4c object lens
41-49 characteristics to which classifiers 31-39 are sensitive
5 sample
5a thin section of biological material
5b object slide
5c structure to be ablated on sample 5
5d three-dimensional object as a sample 5
55 surface of the sample 5
61 CARS detector in transmission
61a condenser
61b beam splitter in CARS detector 61
61c, 61d photomultiplier in CARS detector 61
62 CARS detector in reflection
62 first dichromatic beam splitter for splitting off 7a
62b second dichromatic beam splitter for splitting off 7b, 7c
62c photomultiplier for wavelength component 7c
62d third dichromatic beam splitter, separates 7b from 7c
62e photomultiplier for wavelength component 7b
621 photomultiplier for wavelength component 7a
62q photodiode for wavelength share 7d
62x beam splitter in simple CARS detector 62
62y photomultiplier in simple CARS detector 62
62z photodiode in simple CARS detector 62
63a-63d dielectric filters
64 image taken by the laser microscope 1
64a noise in picture 64
65 test noise
66 test image generated from picture 64 and test noise 65
67 result of classifier 31-39 at picture 64
68 result of classifier 31-39 on test image 66
69 comparison of results 67, 68
7 response generated by the sample 5
7a-7d wavelength components of the response 7
81 arterial wall
82 deposits on arterial wall 81
83 Interior of the artery, limited by arterial wall 81
91 dichromatic beam splitter for merging 11, 21
92 polarization maintaining beam splitter for merging 11, 21
$\omega_0$ frequency of the excitation beam 11 behind the spectral filter 19
$\Delta\omega$ frequency shift in photonic crystal fiber 19b

The invention claimed is:

1. A laser microscope, comprising:
at least one first laser source configured to emit at least one excitation beam having pulses;
an optical scanner configured to scan the at least one excitation beam over the surface of a sample;
focusing optics configured to focus the at least one excitation beam onto the sample;
at least one detector configured to detect light emitted from the sample due to an optical effect in response to the at least one excitation beam impacting the sample;

a second laser source configured to provide a pulsed ablation beam for a local ablation of a material of the sample; and a spectral filter through which the at least one excitation beam is guided, wherein the optical scanner and the focusing optics guide the ablation beam to the sample, wherein the first and second laser sources are fed by at least one of a mutual continuous wave pump laser or a mutual pulsed pump laser, wherein the first laser source emits the pulses with at least two different wavelengths, and wherein a particular beam provided by the mutual continuous wave pump laser is guided into an optical oscillator, and further comprising a beam splitter configured to split a pulsed beam emitted by the optical oscillator in (i) the at least one excitation beam, and (ii) the ablation beam.

2. The laser microscope of claim 1, wherein the first laser source emits the pulses with at least three different wavelengths.

3. The laser microscope of claim 1, wherein the pulsed ablation beam provided by the second laser source has at least one wavelength that is congruent with at least one wavelength of the at least one excitation beam emitted by the first laser source.

4. The laser microscope of claim 1, wherein the at least one excitation beam and the ablation beam have different wavelengths, and further comprising a dichromatic beam splitter merging the excitation and ablation beams.

5. The laser microscope of claim 1, wherein polarization directions of the first laser source and the second laser source are provided at an angle between about 70 and 110 degrees.

6. The laser microscope of claim 5, wherein the polarization directions are orthogonal to each other.

7. The laser microscope of claim 5, further comprising a polarization maintaining beam splitter configured to merge the at least one excitation beam and the ablation beam.

8. The laser microscope of claim 1, wherein a particular beam provided by the mutual continuous wave pump laser is guided into an optical oscillator, and further comprising a beam splitter configured to split a pulsed beam emitted by the optical oscillator in (i) the at least one excitation beam, and (ii) the ablation beam.

9. The laser microscope of claim 8, further comprising a spectral filter through which the at least one excitation beam is guided.

10. The laser microscope of claim 1, wherein the at least one detector is configured to detect the light formed from the at least one excitation beam by coherent Raman scattering.

11. The laser microscope of claim 10, wherein the at least one detector is configured to detect the light formed from the at least one excitation beam by coherent anti-Stokes Raman scattering (CARS) and stimulated Raman scattering (SRS).

12. The laser microscope of claim 1, wherein a wavelength emitted by at least one of the first laser source or the second laser source is between about 750 nm and about 3 μm.

13. The laser microscope of claim 12, wherein the wavelength emitted by at least one of the first laser source or the second laser source is between about 750 nm and about 2 μm.

14. The laser microscope of claim 13, wherein the wavelength emitted by at least one of the first laser source or the second laser source is between about 750 nm and 1.5 μm.

15. The laser microscope of claim 14, wherein the at least one detector is configured to be sensitive for the light that the sample emits due to a nonlinear optical effect in response of the at least one excitation beam impacting the sample.

16. A method for operating or providing a laser microscope, the laser microscope causing a pulsed excitation beam and a pulsed ablation beam to be guided to a sample, the method comprising:

scanning the pulsed excitation beam and the pulsed ablation beam over the sample, wherein the pulsed excitation beam is fed by at least one of a mutual continuous wave pump laser or a mutual pulsed pump laser, and wherein a particular beam provided by the mutual continuous wave pump laser is guided into an optical oscillator;

splitting, using a beam slitter, a pulsed beam emitted by the optical oscillator in (i) the pulsed excitation beam, and (ii) the pulsed ablation beam;

using at least one detector, detecting light emitted by the sample due to a nonlinear optical effect in response to the pulsed excitation beam impacting the sample; and guiding the excitation beam through a spectral filter, wherein the pulse duration of the pulsed ablation beam is selected to be between about 35 fs and about 300 fs.

17. The method of claim 16, wherein a pulse duration of the excitation beam is selected to be longer by a factor between about 10 and 1000 than a pulse duration of the pulsed ablation beam.

18. The method of claim 16, wherein a pulse duration of the pulse excitation beam is selected from a range between about 1 ps and about 100 ps.

19. The method of claim 18, wherein the pulse duration of the pulse excitation beam is selected from a range between about 5 ps and about 40 ps.

20. The method of claim 19, wherein the pulse duration of the pulse excitation beam is selected from a range between about 10 ps and about 20 ps.

21. The method of claim 16, wherein a repetition rate of pulses of the pulsed excitation beam is selected between about 1 MHz and about 40 MHz.

22. The method of claim 21, wherein the repetition rate of the pulses of the pulsed excitation beam is selected between about 1 MHz and about 20 MHz.

23. The method of claim 16, wherein a repetition rate of pulses of the pulsed ablation beam is selected between about 100 kHz to about 10 MHz.

24. The method of claim 23, wherein the repetition rate of the pulses of the pulsed ablation beam is selected between about 100 kHz and about 1 MHz.

25. The method of claim 16, further comprising:

obtaining the image by scanning the excitation beam; and analyzing the image as to whether the sample has a predetermined structure or a characteristic by applying at least one multivariant classifier.

26. The method of claim 25, further comprising:

changing the image to a test image by a superimposition with noise; and analyzing a reliability of the at least one multivariant classifier by comparing results provided by the at least one multivariant classifier when applied on the image and the test image.

27. The method of claim 16, wherein the laser microscope comprises:

at least one first laser source configured to emit the pulsed excitation beam;

a optical scanner configured to scan the pulsed excitation beam over the surface of the sample;

focusing optics configured to focus the pulsed excitation beam onto the sample; and a second laser source configured to provide the pulsed ablation beam for a local ablation of a material of the sample, wherein the optical scanner and the focusing optics guide the ablation beam to the sample, wherein the first and second laser sources are fed by at least one of the mutual continuous wave pump laser or the mutual pulsed pump laser, and wherein the first laser source emits the pulses with at least two different wavelengths.

28. The method of claim 16, wherein the pulse duration of the pulsed ablation beam is selected to be between about 100 fs and about 300 fs.

* * * * *